(12) United States Patent
Niimi

(10) Patent No.: US 9,242,577 B2
(45) Date of Patent: Jan. 26, 2016

(54) VEHICLE INCLUDING REGENERATION LEVEL SELECTOR FOR MOTOR

(71) Applicant: TOYOTA JIDOSHA KABUSHIKI KAISHA, Toyota-shi, Aichi-ken (JP)

(72) Inventor: Kuniaki Niimi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/333,252

(22) Filed: Jul. 16, 2014

(65) Prior Publication Data

US 2015/0066269 A1 Mar. 5, 2015

(30) Foreign Application Priority Data

Aug. 29, 2013 (JP) .................. 2013-178151

(51) Int. Cl.

| | |
|---|---|
| *B60L 9/00* | (2006.01) |
| *B60K 6/42* | (2007.10) |
| *B60L 15/20* | (2006.01) |
| *B60L 3/00* | (2006.01) |
| *B60L 1/00* | (2006.01) |
| *B60L 7/14* | (2006.01) |
| *B60L 11/12* | (2006.01) |
| *B60L 11/14* | (2006.01) |
| *B60L 11/18* | (2006.01) |

(52) U.S. Cl.
CPC ............. *B60L 15/2009* (2013.01); *B60L 1/003* (2013.01); *B60L 3/0015* (2013.01); *B60L 7/14* (2013.01); *B60L 11/123* (2013.01); *B60L 11/14* (2013.01); *B60L 11/1861* (2013.01); *B60L 2210/14* (2013.01); *B60L 2210/40* (2013.01); *B60L 2240/12* (2013.01); *B60L 2240/34* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2250/10* (2013.01); *B60L 2250/16* (2013.01); *B60L 2250/24* (2013.01); *B60L 2250/26* (2013.01); *Y10S 903/947* (2013.01)

(58) Field of Classification Search
USPC .......................................... 701/22; 180/65.22
See application file for complete search history.

(56) References Cited

U.S. PATENT DOCUMENTS

| | | | |
|---|---|---|---|
| 2005/0123173 A1 | 6/2005 | Isaji et al. | |
| 2009/0043470 A1* | 2/2009 | Ahn ................................ | 701/70 |
| 2010/0030434 A1* | 2/2010 | Okabe et al. .................... | 701/48 |
| 2010/0038156 A1* | 2/2010 | Fujitake et al. ............. | 180/65.22 |
| 2010/0198478 A1* | 8/2010 | Shin ................................ | 701/96 |

(Continued)

FOREIGN PATENT DOCUMENTS

| | | |
|---|---|---|
| JP | 2000-224713 A | 8/2000 |
| JP | 2005-170154 A | 6/2005 |
| JP | A-2007-245834 | 9/2007 |

*Primary Examiner* — Thomas G Black
*Assistant Examiner* — Tyler Paige
(74) *Attorney, Agent, or Firm* — Oliff PLC

(57) ABSTRACT

A distance sensor detects a distance to an object in front of a vehicle. An ECU executes pre-crash control when the detected distance becomes equal to or smaller than a prescribed value. A regeneration level selector selects a regeneration level of a motor in accordance with driver's operation. A motor makes regenerative braking force at the time of turning off an accelerator larger when the selected regeneration level is high than when the selected regeneration level is low. The ECU makes the prescribed value larger when the selected regeneration level is low than when the selected regeneration level is high.

6 Claims, 6 Drawing Sheets

(56) References Cited

U.S. PATENT DOCUMENTS

2010/0250083 A1* 9/2010 Takahashi et al. ............. 701/70
2012/0116665 A1* 5/2012 Aoki et al. .................... 701/301
2013/0103239 A1* 4/2013 Kamijo ........................... 701/22
2013/0110368 A1* 5/2013 Zagorski ......................... 701/70
2013/0211644 A1* 8/2013 Yokoyama et al. ............. 701/22

* cited by examiner

FIG.2

| REGENERATION LEVEL | RISK NOTIFICATION DISTANCE |
|---|---|
| 0 | d0 |
| 1 | d1 |
| 2 | d2 |
| 3 | d3 |
| 4 | d4 |

FIG.4

| REGENERATION LEVEL | VEHICLE SPEED | RISK NOTIFICATION DISTANCE |
|---|---|---|
| 0 | v1≤v | d01 |
| | v2≤v<v1 | d02 |
| | v3≤v<v2 | d03 |
| | v4≤v<v3 | d04 |
| | v5≤v<v4 | d05 |
| | v6≤v<v5 | d06 |
| | v7≤v<v6 | d07 |
| 1 | v1≤v | d11 |
| | v2≤v<v1 | d12 |
| | v3≤v<v2 | d13 |
| | v4≤v<v3 | d14 |
| | v5≤v<v4 | d15 |
| | v6≤v<v5 | d16 |
| | v7≤v<v6 | d17 |
| 2 | v1≤v | d21 |
| | v2≤v<v1 | d22 |
| | v3≤v<v2 | d23 |
| | v4≤v<v3 | d24 |
| | v5≤v<v4 | d25 |
| | v6≤v<v5 | d26 |
| | v7≤v<v6 | d27 |
| 3 | v1≤v | d31 |
| | v2≤v<v1 | d32 |
| | v3≤v<v2 | d33 |
| | v4≤v<v3 | d34 |
| | v5≤v<v4 | d35 |
| | v6≤v<v5 | d36 |
| | v7≤v<v6 | d37 |
| 4 | v1≤v | d41 |
| | v2≤v<v1 | d42 |
| | v3≤v<v2 | d43 |
| | v4≤v<v3 | d44 |
| | v5≤v<v4 | d45 |
| | v6≤v<v5 | d46 |
| | v7≤v<v6 | d47 |

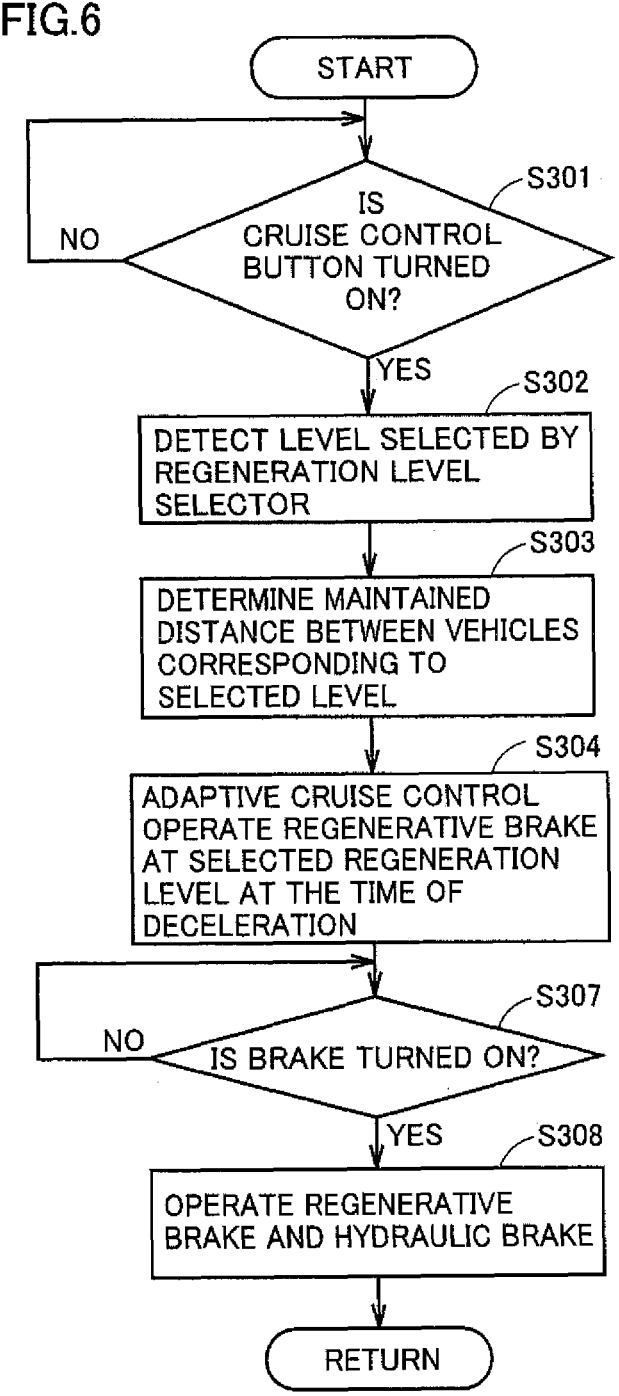

VEHICLE INCLUDING REGENERATION LEVEL SELECTOR FOR MOTOR

This nonprovisional application is based on Japanese Patent Application No. 2013-178151 filed on Aug. 29, 2013 with the Japan Patent Office, the entire contents of which are hereby incorporated by reference.

BACKGROUND OF THE INVENTION

1. Field of the Invention

The present invention relates to a vehicle, and particularly to a vehicle including a regeneration level selector for a motor and executing pre-crash control when a distance to an object in front becomes short.

2. Description of the Background Art

There has been conventionally known a vehicle in which pre-crash control such as issuance of an alarm is executed when a distance between the vehicle and a vehicle in front becomes equal to or smaller than a prescribed value. For example, a traveling control device for a vehicle described in Japanese Patent Laying-Open No. 2007-245834 changes the aforementioned prescribed value depending on the vehicle speed, thereby issuing an alarm when the distance between the vehicles corresponding to the vehicle speed is reached.

SUMMARY OF THE INVENTION

There has been known a vehicle traveling with a motor, in which a driver can variably set a regeneration level of the motor at the time of turning off an accelerator, by using a so-called regeneration level selector. In such a vehicle, a braking distance during a period of switching from an accelerator to a brake by the driver changes depending on the regeneration level of the motor set by the driver. Therefore, even if an alarm issuance distance is changed depending on the vehicle speed as described in Japanese Patent Laying-Open No. 2007-245834, the driver does not obtain a feeling of the regeneration level. In addition, in the vehicle traveling with the motor, a change in deceleration cannot be identified by engine sound, unlike paddle shift of conventional vehicles.

Thus, an object of the present invention is to provide a vehicle including a regeneration level selector for a motor, in which a feeling of deceleration can be brought to a driver, for example, when an accelerator is turned off.

A vehicle includes: a motor serving as a driving force source for the vehicle; a detecting unit for detecting a distance to an object in front of the vehicle; a control unit for executing pre-crash control when the detected distance becomes equal to or smaller than a prescribed value; and a selecting unit for selecting a regeneration level of the motor in accordance with driver's operation. The motor makes regenerative braking force at the time of turning off an accelerator larger when the selected regeneration level is high than when the selected regeneration level is low, and the control unit makes the prescribed value larger when the selected regeneration level is low than when the selected regeneration level is high.

With the aforementioned configuration, the distance between the vehicles at the time of executing the pre-crash control changes based on the selected regeneration level. Therefore, the driver can obtain a feeling of the regeneration level when the pre-crash control is executed.

Preferably, even while the accelerator is on, the control unit executes the pre-crash control when the detected distance becomes equal to or smaller than the prescribed value.

Even while the accelerator is on, the distance between the vehicles at the time of executing the pre-crash control is set, anticipating the subsequent situation in which a deceleration at the time of turning off the accelerator is small. As a result, a time lag required for switching from an accelerator pedal to a brake pedal can be dealt with.

Preferably, the control unit notifies a driver of a warning as the pre-crash control.

When the distance between the vehicles becomes short, the driver is notified of the warning. As a result, the driver can decelerate the vehicle by switching from the accelerator pedal to the brake pedal.

Preferably, the control unit decelerates the vehicle as the pre-crash control.

As a result, when the distance between the vehicles becomes short, the vehicle can be decelerated automatically.

Preferably, the control unit sets the prescribed value based on the selected regeneration level and the detected vehicle speed.

As a result, by using the selected regeneration level and the vehicle speed, the distance between the vehicles at the time of executing the pre-crash control can be set at a more appropriate value.

A vehicle according to the present invention includes: a motor serving as a driving force source for the vehicle; a detecting unit for detecting a distance to an object in front of the vehicle; a control unit for executing adaptive cruise control as pre-crash control such that the detected distance has a prescribed value; and a selecting unit for selecting a regeneration level of the motor in accordance with driver's operation, wherein the motor makes regenerative braking force at the time of deceleration during the adaptive cruise control larger when the selected regeneration level is high than when the selected regeneration level is low, and the control unit makes the prescribed value larger when the selected regeneration level is low than when the selected regeneration level is high.

As a result, during the adaptive cruise control, the maintained distance between the vehicles changes depending on the selected regeneration level. Therefore, the driver can obtain the feeling of the regeneration level at the time of deceleration.

According to the present invention described above, in the vehicle including the regeneration level selector for the motor, the feeling of deceleration can be brought to the driver when the accelerator is turned off.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing an example of a map defining a relationship between a selected regeneration level and a risk notification distance.

FIG. 4 is a diagram showing an example of a map defining a relationship among a selected regeneration level, a vehicle speed and a risk notification distance.

FIG. 6 is a flowchart showing a control procedure in a third embodiment.

DESCRIPTION OF THE PREFERRED EMBODIMENTS

Figure 1:
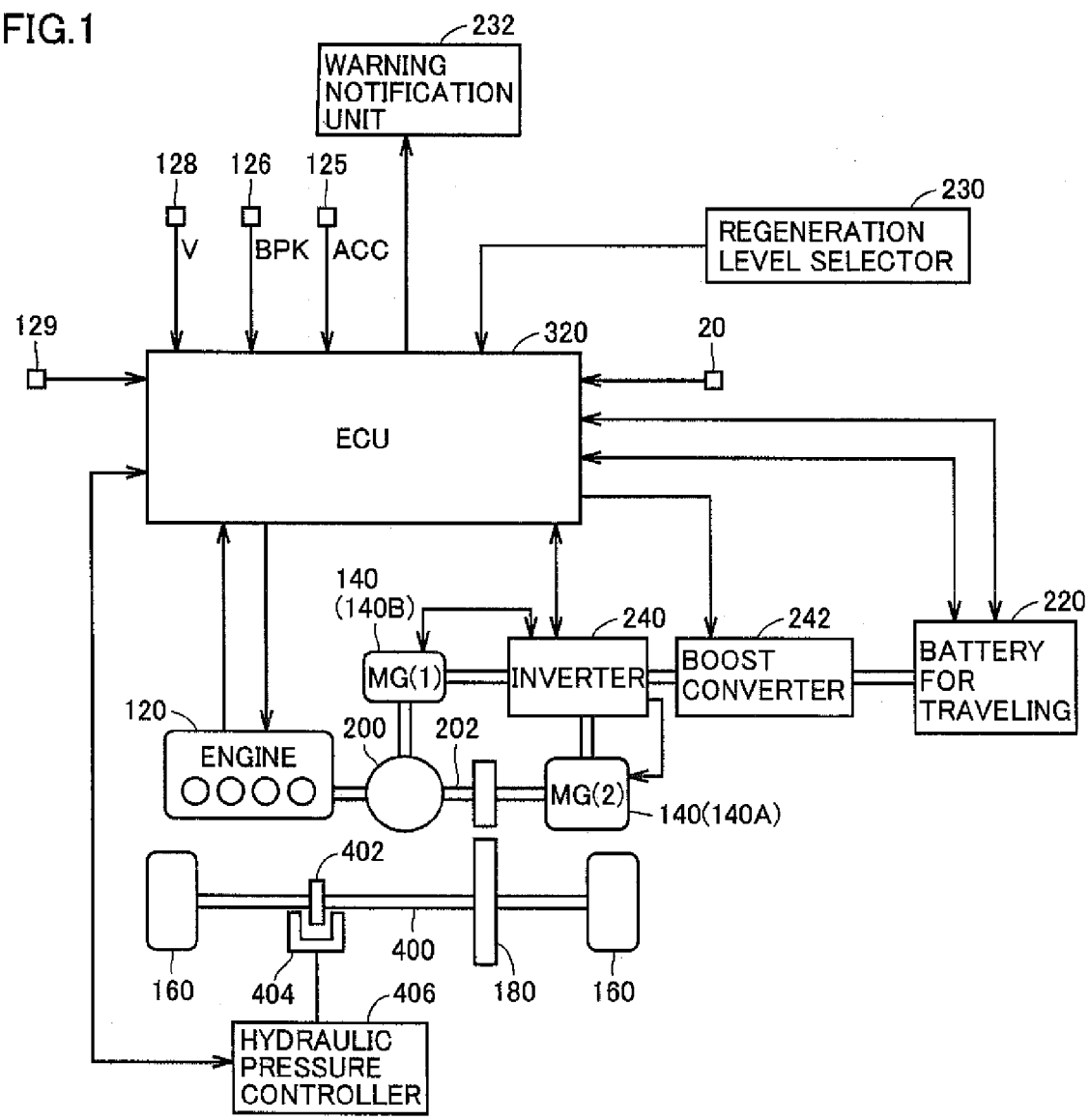
FIG. 1 is a control block diagram of a hybrid vehicle according to an embodiment of the present invention.

Embodiments of the present invention will be described hereinafter with reference to the drawings. In the following description, the same reference characters are assigned to the same components. Their names and functions are also the same. Therefore, detailed description about them will not be repeated.

First Embodiment

A control block diagram of a hybrid vehicle according to an embodiment of the present invention will be described with reference to FIG. 1. It is to be noted that the present invention is not limited to the hybrid vehicle shown in FIG. 1. The present invention may be applied to another type of hybrid vehicle having a secondary battery mounted thereon. Instead of the secondary battery, a power storage mechanism such as a capacitor may be mounted on the hybrid vehicle. When the secondary battery is mounted, the secondary battery may be a nickel-metal hydride battery, a lithium ion battery or the like, and the type thereof is not particularly limited.

The hybrid vehicle includes: an internal combustion engine (hereinafter simply referred to as "engine") 120 such as, for example, a gasoline engine and a diesel engine serving as a driving source; and a motor generator (MG) 140. Although motor generator 140 is expressed as a motor 140A and a generator 140B (or motor generator 1408) in FIG. 1 for convenience in description, motor 140A may function as a generator or generator 140B may function as a motor, depending on a traveling state of the hybrid vehicle. When this motor generator functions as a generator, regenerative braking is executed. When the motor generator functions as a generator, kinetic energy of the vehicle is converted into electric energy to decelerate the vehicle.

In addition to these, the hybrid vehicle includes: a speed reducer 180 for transmitting to a driving wheel 160 the motive powers generated by engine 120 and motor generator 140 and for transmitting driving of driving wheel 160 to engine 120 and motor generator 140; a power split mechanism (e.g., planetary gear mechanism) 200 for distributing the motive power generated by engine 120 into two paths, i.e., driving wheel 160 and generator 140B; a battery for traveling 220 for charging electric power for driving motor generator 140; and an inverter 240 for controlling current while converting direct current of battery for traveling 220 from/to alternating current of motor 140A and generator 140B.

In the present embodiment, a boost converter 242 is provided between battery for traveling 220 and inverter 240. Since a rated voltage of battery for traveling 220 is lower than a rated voltage of motor 140A and motor generator 140B, boost converter 242 is used to boost the electric power when the electric power is supplied from battery for traveling 220 to motor 140A and motor generator 140B.

The hybrid vehicle further includes: a brake disc 402 provided at a drive shaft 400 connected to driving wheel 160; a brake mechanism 404; and a hydraulic pressure controller 406. Brake mechanism 404 receives a brake hydraulic pressure from hydraulic pressure controller 406, and sandwiches brake disc 402 and generates frictional braking force in accordance with the received brake hydraulic pressure, thereby decelerating the vehicle. Hydraulic pressure controller 406 receives a brake control signal from an ECU 320, calculates a brake hydraulic pressure for generating the frictional braking force (hydraulic brake) indicated by the brake control signal, and outputs the calculated brake hydraulic pressure to brake mechanism 404.

The hybrid vehicle also includes ECU 320 for controlling an operating state of engine 120, controlling motor generator 140, battery for traveling 220, inverter 240 and the like in accordance with a state of the hybrid vehicle, and controlling the overall hybrid system such that the hybrid vehicle can travel most efficiently.

As power split mechanism 200, a planetary gear mechanism (planetary gear) is representatively used to distribute the motive power generated by engine 120 to both driving wheel 160 and motor generator 140B. By controlling the rotation speed of motor generator 140B, power split mechanism 200 also serves as a continuously variable transmission. Torque of engine 120 is input to a planetary carrier (C), and is transmitted to motor generator 140B by a sun gear (S) and is transmitted to the motor and an output shaft (the driving wheel 160 side) by a ring gear (R). When stopping engine 120 currently being rotated, kinetic energy resulting from the rotation of engine 120 is converted by motor generator 140B into electric energy to decrease the rotation speed of engine 120.

In the hybrid vehicle having the hybrid system mounted thereon as shown in FIG. 1, when engine 120 is poor in efficiency at startup or during slow speed traveling, the hybrid vehicle travels only using motor 140A of motor generator 140. During normal traveling, for example, power split mechanism 200 splits the motive power provided from engine 120 into the two paths, thereby directly driving driving wheel 160 on one hand and driving generator 140B to generate electric power on the other hand. The electric power generated on this occasion is employed to drive motor 140A to assist driving of driving wheel 160. During high speed traveling, electric power is supplied from battery for traveling 220 to motor 140A to increase the output of motor 140A, thus providing additional driving force to driving wheel 160. Meanwhile, upon deceleration, motor 140A, which operates according to driving wheel 160, serves as a generator to perform regenerative power generation, and the electric power thus recovered is stored in battery for traveling 220. When an amount of charge in battery for traveling 220 is decreased and battery for traveling 220 therefore particularly needs to be charged, the output of engine 120 is increased to increase an amount of electric power generated by generator 140B. In this way, an amount of charge supplied to battery for traveling 220 is increased. Also during slow speed traveling, an amount of driving of engine 120 is controlled to increase when required, for example, when battery for traveling 220 needs to be charged as described above, when driving an auxiliary device such as an air conditioner, when increasing the temperature of coolant in engine 120 to a predetermined temperature, and the like.

A distance sensor 20 detects a distance between an object in front (vehicle) and the vehicle of the present invention. Distance sensor 20 detects an interval between the vehicles by emitting radio waves and the like toward the vehicle in front and detecting reflection thereof. Distance sensor 20 can also calculate a vehicle speed of the vehicle in front, based on a temporal change in this interval between the vehicles and a vehicle speed of the vehicle of the present invention.

A regeneration level selector 230 selects a regeneration level in accordance with user's operation. In the embodiment of the present invention, there are five regeneration levels of 0 to 4, for example, and as the regeneration level becomes lower, the regenerative braking force generated by motor 140A becomes smaller. Regeneration level selector 230 may be like a continuous switch.

In accordance with an instruction from ECU 320, a warning notification unit 232 generates a warning sound for notifying a driver of risk as one form of the pre-crash control.

A speed sensor 128 detects a speed of the vehicle. A brake sensor 126 detects pressing of a brake pedal and an amount of pressing. An accelerator sensor 125 detects pressing of an accelerator pedal and an amount of pressing. A cruise control button 129 is a button for setting ON/OFF of cruise control.

During a period from when the driver finishes the operation of pressing the accelerator pedal to when the driver presses the brake pedal, ECU 320 operates a regenerative brake by motor 140A, at the regeneration level selected by regeneration level selector 230.

While the driver is pressing the brake pedal, ECU 320 operates the hydraulic brake together with the regenerative brake to generate the braking force corresponding to the amount of pressing of the brake pedal. Alternatively, ECU 320 may set the regenerative braking force immediately after the start of pressing of the brake pedal to correspond to the regeneration level selected by regeneration level selector 230, and then, operate the hydraulic brake together with the regenerative brake to generate the braking force corresponding to the amount of pressing of the brake pedal.

When the distance to the object in front is equal to or shorter than a risk notification distance, ECU 320 generates a warning sound by warning notification unit 232. The risk notification distance changes depending on the selected regeneration level. FIG. 2 is a diagram showing an example of a map defining a relationship between the selected regeneration level and the risk notification distance. In FIG. 2, $d0>d1>d2>d3>d4$. Namely, this map defines such a relationship that as the regeneration level becomes lower, a movement distance at the time of operation of the regenerative brake becomes longer and thus the risk notification distance becomes longer.

Figure 3:
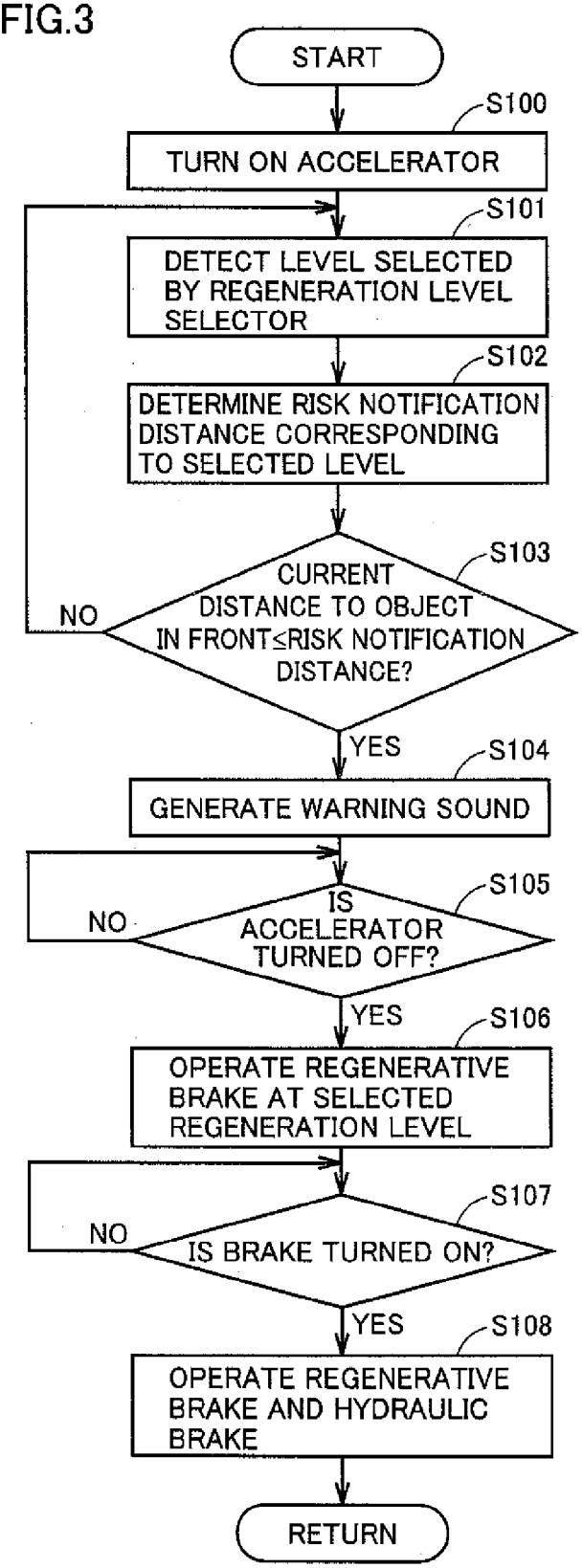
FIG. 3 is a flowchart showing a control procedure in the first embodiment.

FIG. 3 is a flowchart showing a control procedure in the first embodiment.

In step S100, the driver performs the operation of pressing the accelerator pedal (turns on the accelerator) and causes the vehicle to travel.

In step S101, ECU 320 detects the regeneration level selected by regeneration level selector 230.

In step S102, ECU 320 determines the risk notification distance corresponding to the selected regeneration level, in accordance with the map shown in FIG. 2.

In step S103, ECU 320 moves the process to step S104 when the current distance to the object in front is equal to or shorter than the risk notification distance, and returns the process to step S101 when the current distance to the object in front exceeds the risk notification distance.

In step S104, ECU 320 generates a warning sound by warning notification unit 232.

In step S105, if the driver finishes the operation of pressing the accelerator pedal (turns off the accelerator), the process proceeds to step S106.

In step S106, ECU 320 operates the regenerative brake at the selected regeneration level.

In step S107, if the driver performs the operation of pressing the brake pedal (turns on the brake), the process proceeds to step S108.

In step S108, ECU 320 operates the hydraulic brake together with the regenerative brake.

By the aforementioned control in the first embodiment, the regenerative brake is operated at the selected regeneration level during the period from when the driver finishes the operation of pressing the accelerator pedal to when the driver presses the brake pedal. As the regeneration level becomes lower, the braking force of the regenerative brake becomes smaller, and thus, the movement distance of the vehicle becomes longer. Therefore, by increasing the risk notification distance, crash can be avoided and the feeling of deceleration can be brought to the driver when the accelerator is turned off.

Second Embodiment

In the present embodiment, in view of the fact that the movement distance becomes longer as the vehicle speed becomes higher during the period from when the driver finishes the operation of pressing the accelerator pedal to when the driver presses the brake pedal, the risk notification distance is changed in accordance with the selected regeneration level and the vehicle speed.

Figure 5:
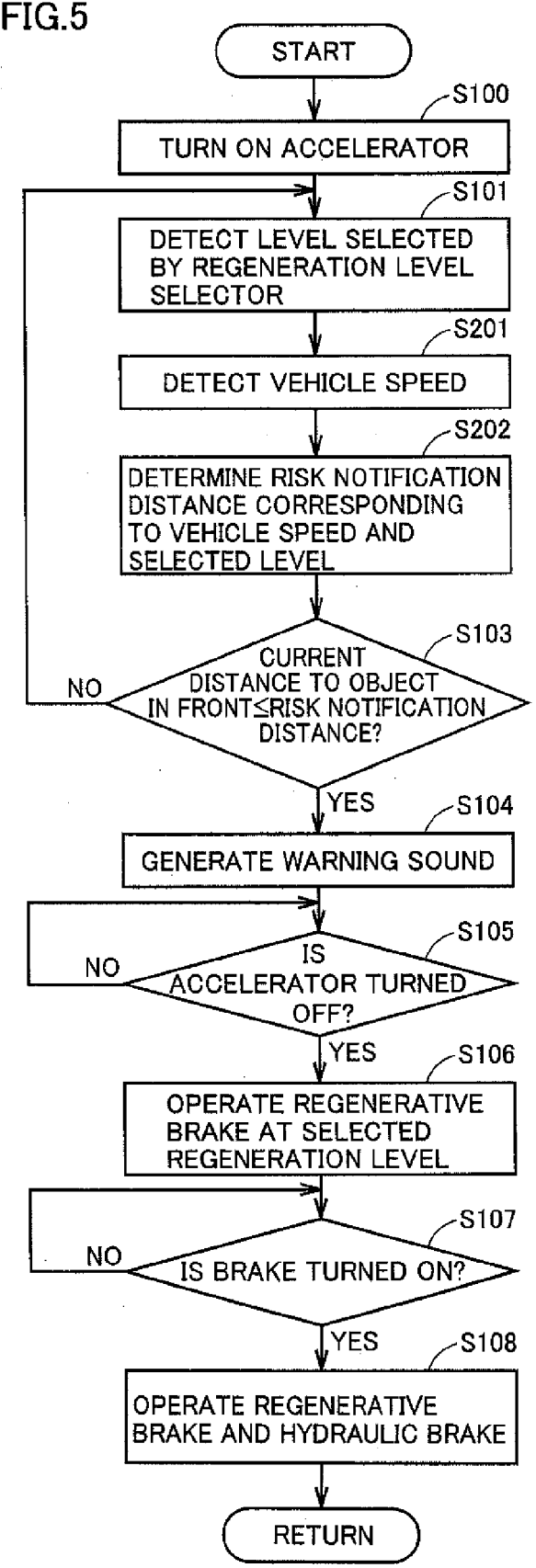
FIG. 5 is a flowchart showing a control procedure in a second embodiment.

FIG. 5 is a flowchart showing a control procedure in a second embodiment.

The flowchart in FIG. 5 is different from the flowchart in FIG. 1 in that step S201 is performed after step S101, and step S202 is performed instead of step S102.

In step S201, ECU 320 obtains the vehicle speed detected by speed sensor 128.

In step S202, ECU 320 determines the risk notification distance corresponding to the selected regeneration level and the vehicle speed, in accordance with a map shown in FIG. 4.

FIG. 4 is a diagram showing an example of the map defining a relationship among the selected regeneration level, the vehicle speed and the risk notification distance.

In FIG. 4, $dx0<dx1<dx2<dx3<dx4<dx5<dx6<dx7$. In this regard, x=0 to 4. Namely, this map defines such a relationship that as the vehicle speed becomes higher, the movement distance at the time of operation of the regenerative brake becomes longer and thus the risk notification distance becomes longer.

In addition, in FIG. 4, $d0y>d1y>d2y>d3y>d4y$. In this regard, s, y=1 to 7. Namely, this map defines such a relationship that as the regeneration level becomes lower, the movement distance at the time of operation of the regenerative brake becomes longer and thus the risk notification distance becomes longer.

By the aforementioned control in the second embodiment, the risk notification distance is changed in accordance with the selected regeneration level and the vehicle speed. Therefore, crash can be avoided more reliably and the feeling of deceleration can be brought to the driver when the accelerator is turned off.

Third Embodiment

In the present embodiment, description will be given to a method for maintaining the distance between the vehicles in accordance with the selected regeneration level, during adaptive cruise control for keeping constant the distance between the vehicle and the vehicle in front, which is one form of the pre-crash control.

FIG. 6 is a flowchart showing a control procedure in a third embodiment.

In step S301, if the driver turns on cruise control button 129 during traveling, the process proceeds to step S302.

In step S302, ECU 320 detects the regeneration level selected by regeneration level selector 230.

In step S303, ECU 320 determines a maintained distance (X) between the vehicles corresponding to the selected regeneration level, in accordance with the map.

In step S304, ECU 320 executes the adaptive cruise control. Namely, following traveling is performed such that the distance to the object (vehicle) in front (distance between the vehicles) becomes the maintained distance (X) between the vehicles corresponding to the selected regeneration level. When the distance between the vehicles is longer than maintained distance X between the vehicles, ECU 320 accelerates the vehicle, thereby bringing the distance between the vehicles closer to maintained distance X between the vehicles. When the distance between the vehicles is shorter than maintained distance X between the vehicles, ECU 320 decelerates the vehicle, thereby bringing the distance between the vehicles closer to maintained distance X between the vehicles. At the time of deceleration of the vehicle, ECU 320 operates the regenerative brake at the selected regeneration level.

In step S307, if the driver performs the operation of pressing the brake pedal (turns on the brake), the process proceeds to step S308.

In step S308, ECU 320 operates the regenerative brake and the hydraulic brake.

As described above, in the present embodiment, during the adaptive cruise control for keeping the distance between the vehicle and the vehicle in front at a prescribed value (maintained distance between the vehicles), the braking force of the regenerative brake is smaller when the regeneration level is low than when the regeneration level is high, and thus, the maintained distance between the vehicles is made longer. As a result, the driver can obtain the feeling of the regeneration level at the time of deceleration. In addition, there can be avoided a risk that may occur in a case where the distance between the vehicles becomes extremely short, for example, when the vehicle in front is greatly decelerated suddenly.

(Modification)

The present invention is not limited to the aforementioned embodiments and includes the following modification as well.

(1) State of Charge (SOC) of Battery for Traveling 220

In addition to regenerative braking (regenerative brake) and frictional braking (hydraulic brake) described above, braking to decelerate the vehicle includes engine braking (engine brake). In the engine braking, by controlling generator 140B to be driven as a motor, the engine is brought into a driven state and the braking force is generated by engine friction, pumping loss and the like, thereby decelerating the vehicle. The engine braking takes place by reducing an amount of fuel injection to engine 120, and larger braking force is generated by stopping fuel injection to such an extent that engine stall does not occur. When the motive power distribution by power split mechanism 200 does not change, the engine braking force becomes larger as an engine rotation speed NE of engine 120 becomes higher.

In accordance with the SOC of battery for traveling 220, the control may be switched as follows. For example, when the SOC of battery for traveling 220 is equal to or smaller than a prescribed value, ECU 320 operates the regenerative brake at the selected regeneration level during the period from when the driver finishes the operation of pressing the accelerator pedal to when the driver presses the brake pedal. When the SOC of battery for traveling 220 exceeds the prescribed value, ECU 320 operates the engine brake.

(2) Pre-Crash Control

In the first and second embodiments of the present invention, when the current distance to the object in front is equal to or shorter than the risk notification distance, ECU 320 generates a warning sound as the pre-crash control. The present invention is not, however, limited thereto. ECU 320 may decelerate the vehicle by using the regenerative brake and/or the engine brake.

While the embodiments of the present invention have been described, it should be understood that the embodiments disclosed herein are illustrative and not limitative in any respect. The scope of the present invention is defined by the terms of the claims and is intended to include any modifications within the scope and meaning equivalent to the terms of the claims.

What is claimed is:

1. A vehicle, comprising:
a motor serving as a driving force source for the vehicle;
a detector configured to detect a distance to an object in front of the vehicle;
an electronic control unit configured to execute pre-crash control when the detected distance detected by the detector becomes equal to or smaller than a prescribed value; and
a selecting unit configured to select a regeneration level of the motor in accordance with an operation of a driver of the vehicle, wherein
the motor makes a regenerative braking force at a time of turning off an accelerator larger when the selected regeneration level is high compared to when the selected regeneration level is low, and
the electronic control unit sets the prescribed value based on the selected regeneration level so as to make the prescribed value larger when the selected regeneration level is low compared to when the selected regeneration level is high.

2. The vehicle according to claim 1, wherein
even while the accelerator is on, the electronic control unit executes the pre-crash control when the detected distance becomes equal to or smaller than the prescribed value.

3. The vehicle according to claim 1, wherein
the electronic control unit provides the driver of the vehicle with a warning as the pre-crash control.

4. The vehicle according to claim 1, wherein
the electronic control unit decelerates the vehicle as the pre-crash control.

5. The vehicle according to claim 1, wherein
the electronic control unit sets the prescribed value based on the selected regeneration level and a detected vehicle speed.

6. A vehicle, comprising:
a motor serving as a driving force source for the vehicle;
a detector configured to detect a distance to an object in front of the vehicle;
an electronic control unit configured to execute adaptive cruise control as pre-crash control such that the detected distance detected by the detector has a prescribed value; and
a selecting unit configured to select a regeneration level of the motor in accordance with an operation of a driver of the vehicle, wherein
the motor makes a regenerative braking force at a time of deceleration during the adaptive cruise control larger when the selected regeneration level is high compared to when the selected regeneration level is low, and
the electronic control unit sets the prescribed value based on the selected regeneration level so as to make the prescribed value larger when the selected regeneration level is low compared to when the selected regeneration level is high.

* * * * *